United States Patent [19]

Keillor, III et al.

[11] Patent Number: 5,320,753
[45] Date of Patent: Jun. 14, 1994

[54] CONTINUOUS FILTER

[75] Inventors: Peter T. Keillor, III, Lake Jackson, Tex.; William A. Kirksey, Midland, Mich.

[73] Assignee: The Dow Chemical Company, Midland, Mich.

[21] Appl. No.: 61,877

[22] Filed: May 17, 1993

Related U.S. Application Data

[63] Continuation-in-part of Ser. No. 600,035, Jun. 18, 1991, abandoned.

[51] Int. Cl.$^5$ .................... B01D 33/04; B01D 33/044
[52] U.S. Cl. ................... 210/398; 210/387; 210/401; 425/197
[58] Field of Search ............... 210/107, 130, 386, 387, 210/398, 400, 401, 741, 783; 425/197, 198; 55/351, 354; 277/152, DIG. 4, DIG. 6

[56] References Cited

U.S. PATENT DOCUMENTS

| | | | |
|---|---|---|---|
| 1,783,181 | 12/1930 | Birkholz | 55/354 |
| 1,797,248 | 3/1931 | Szegari et al. | 210/387 |
| 2,016,991 | 10/1935 | Dollinger | 210/387 |
| 2,675,129 | 4/1954 | Doubleday | 210/387 |
| 2,867,324 | 1/1959 | Hirs | 210/97 |
| 3,464,557 | 9/1969 | Fowler | 210/97 |
| 3,471,017 | 10/1969 | Kalman | 210/774 |
| 3,497,063 | 2/1970 | Hirs | 210/400 |
| 3,596,442 | 8/1971 | Neumann et al. | 55/354 |
| 3,645,399 | 2/1971 | Kalman | 210/97 |
| 3,789,587 | 2/1974 | Moorefield, II | 55/290 |
| 3,856,674 | 12/1974 | Kalman | 210/774 |
| 3,856,680 | 12/1974 | Elmore | 210/184 |
| 3,912,632 | 10/1975 | Winzen | 210/97 |
| 3,940,335 | 2/1976 | Kalman | 210/780 |
| 4,054,521 | 10/1977 | Winzen | 210/137 |
| 4,842,750 | 6/1989 | Britchi | 210/791 |
| 4,849,113 | 7/1989 | Hills | 210/741 |
| 5,041,222 | 8/1991 | O'Dell | 210/386 |

FOREIGN PATENT DOCUMENTS

52-48171  4/1977  Japan ................................. 210/387

Primary Examiner—Matthew O. Savage

[57] ABSTRACT

Filtration process and filters for use with materials such as, but not limited to, melts, utilizing a band of filter medium sealed in the filter rollers to seal the material from the outside. In one embodiment, the seal rollers reduce to a minimum the leakage of melt to the outside and make it possible to advance the filter medium through the filter continuously. In various embodiments, the filter medium can be advanced either by the takeup spool or by driving the seal rollers and the rate of movement of the filter medium through the filter can be controlled to maintain a constant pressure drop across the filter. Two component wear-resistant seals are also provided. Maintaining constant conditions through continuous advancement of the filter medium during filtration yields higher product quality and dimensional stability.

22 Claims, 6 Drawing Sheets

CONTINUOUS FILTER

RELATED APPLICATIONS

This application is a continuation-in-part of U.S. Ser. No. 07/600,035 filed on Jun. 18, 1991, now abandoned.

BACKGROUND OF THE INVENTION

1. Field of the Invention

This invention related to a process and apparatus for filtering a substance flowing through a passage by introducing a filter across the passage, and, more particularly, to an improved method and apparatus for the filtering of heat-softened plastics materials.

2. Description of the Related Art

It is often necessary to purify molten resins, having a viscosity of at least 100 cp, during processing when impurities are present in unacceptable concentrations. This is usually accomplished by straining the thermally softened plastics through a filter medium, usually downstream of an extruder. Such straining can take place in the same barrel used for the extrusion process or in a device completely independent of the extruder. The device of this invention can also be used in a process without regard to whether the processing also includes extrusion.

In time, the filter medium becomes clogged and must be replaced. Opening up the extruder in order to replace the filter interrupts the production and considerably inconveniences the operators who risk coming in contact with the potentially hot and sticky melt in the process of replacing or cleaning the clogged filter. Whether the clogged filter is replaced or cleaned depends on the filter material and the nature of the material being filtered.

The filter medium is usually configured in the form of a screen. A large variety of screen melt filter devices is available on the market or described in the literature. The devices can roughly be classified into two broad categories—screen changing devices and continuous devices.

It is well known that some of the dangers and inefficiencies inherent in the changing of a filter screen can be alleviated by employing two or more screens, each mounted on separate mountings, so that when one screen becomes clogged, a clean screen can quickly be inserted to replace the clogged screen. The switchover is achieved either by incorporating the several screens in a slide or similar device which can be periodically reciprocated or rotated so as to allow a new screen to replace a clogged one, or by redirecting the flow from a clogged filter screen to a clean screen by means of a valve or similar device. A number of specific screen changing devices and mechanisms are described in U.S. Pat. No. 4,842,750, the disclosure of which is hereby incorporated by reference.

A problem often associated with screen changing devices is the interruption of the melt flow during the screen changing. This interruption has a number of undesirable effects. First, the interruption of what would otherwise be a continuous process turns the process into a batch process, with all the attendant disadvantages of batch processes, such as lack of uniformity of product and conditions, dynamics in the system, increased requirement of operator attention and involvement, and reduced reliability. In addition, the operators are forced to handle the clogged filters which are coated with hot, viscous, and sticky melts. Since the filter is taken off-line during the screen changes, a larger filter area, typically in the form of multiple filter screens, must be used in order to accommodate the melt throughflow. Furthermore, an inferior product is produced. Since the quality and dimensional stability of the extrudate are directly related to the pressure variation at the screen, it is usually desired that the pressure at the screen be constant and not vary cyclically with the changing of the screens.

Many screen changing devices call for monitoring the pressure drop across the screen and effectuate the changing of the screens when the pressure drop reaches a certain preset value. This mode of operation results in a monotonically increasing pressure drop across the filter as the filter becomes progressively more clogged, followed by a sudden drop in differential pressure as the clogged screen is removed and a clean screen is put in place. The pressure then again proceeds to increase monotonically as the new screen becomes more clogged, and so on. The effect of this varying pressure differential on the quality and dimensional stability of the extrudate is usually detrimental.

In order to avoid many of the problems associated with screen changers, devices have been proposed, and in some cases commercialized, which replace individual discrete screens with screens in the form of continuous strips which can be advanced when a section becomes dirty. These constantly operating filters have a number of advantages over screen changing devices. Among these are the following: 1) the continuous filters, because they allow for essentially constant filter throughflow, require a smaller screen area; 2) the continuous filters are more conducive to small and compact design; 3) the continuous filters produce constant conditions in the melt channel; and, 4) the continuous filters allow for uniform throughflow.

A number of specific continuous filter devices and mechanisms are described in U.S. Pat. No. 4,849,113, the disclosure of which is hereby incorporated by reference.

Unfortunately, the use of long strips of filter media raises sealing problems, since the mechanism for holding a filter medium in place must periodically be released so as to allow the filter strip to be advanced. Such a release allows the melt, which is under high pressure, to escape to the outside. This results in loss of material and in a messy and potentially dangerous operating environment.

A number of devices incorporating a long strip of filter medium are known. Each strives to solve the sealing problem. U.S. Pat. No. 2,867,324 discloses a method of sealing a continuous filter which includes inflatable sealing tubes. In the inflated condition, these tubes bear under pressure on both sides of the filter medium. When deflated, the sealing tubes allow the filter medium to be advanced a predetermined amount. The tubes are then reinflated to fix the filter medium in place. The operation is intermittent and the design is not likely to be reliable in commercial operations. It is perhaps for this reason that such filters have yet to appear on the market.

Another way of handling the sealing problem is displayed by the various Kalman filters. U.S. Pat. Nos. 3,471,017; 3,645,399; 3,856,674; 3,940,335; and 3,856,680, disclose variations on a continuous filter travelling from a feed spool to a takeup spool. The sealing of the filter medium is accomplished primarily by freezing some of the polymer at the inlet and outlet of the media into the filter housing. The frozen material around the filter media keeps the melt from escaping to the outside. When it is desired to advance the filter medium, the ports are heated to partially melt the seal and to allow the filter to be advanced toward the takeup spool.

Although certain Kalman filters are available commercially, they have various limitations. The reliance on the plugs of solidified material to seal the filter has not been justified, especially for the lower viscosity melts such as epoxy resins. The Kalman filters work best for thermoplastic materials having a wide melting temperature range. Typical epoxy resins are much more uniform and tend to display a relatively narrow range of freezing points.

Operation of the Kalman filter is difficult since, in order to insure a seal, the plugs must be cooled sufficiently to form a relatively solid mass. This mass tends to bind to the inlet and outlet ports, making filter advancement difficult. If the plugs are not completely solidified, leakage of melt material occurs. In addition to requiring very precise and careful control, it has been found that many materials cannot be handled by such filters. For example, materials which are lower in viscosity will not solidify quickly enough or at high enough temperatures to make the operation of the filter efficient.

In addition, such filters do not function properly where the material, such as epoxies, to be filtered lacks self lubricating properties since such materials would adhere strongly to the filter body and cannot easily be separated from the filter body to allow filter movement. Also, such devices require high strength filter media such as metal screen and are unlikely to function properly with certain desirable synthetic aramid fiber filter media such as NOMEX or KEVLAR, which are registered trademarks of DuPont. These devices are also unlikely to function well with other flexible woven matted fabric filter media such as cloth, nylon, and rayon.

U.S. Pat. No 4,842,750 discloses a continuous filter for the filtering of viscous material which discretely feeds a filter medium from a feed spool to a takeup spool based on the differential pressure across the filter. When the filter medium is to be moved, a mechanism is activated which momentarily increases the volume just upstream of the filter. This reduces the pressure on the filter and enables the filter medium to be moved, thereby exposing the new filter medium and removing the clogged filter. Operation of this device is discontinuous.

U.S. Pat. No. 4,849,113 to Hills discloses a polymer filter having two filtering chambers, each with its own associated feed spool and takeup spool. The device is activated by differential pressure across the filters. A three way valve upstream of the filter is intermittently positioned so as to reduce the polymer flow into one of the two chambers and thereby reduce the pressure on the filter associated with that filter. This allows the filter to be pulled through the housing, exposing new filter area to the polymer.

This device, like the other continuous devices described above, is not capable of truly continuous operation. While the filter medium in each case is a long strip which is, in theory, capable of continuous movement, in practice, each of the above devices uses a set of discrete movements, usually controlled by filter pressure drop, to move the filter medium incrementally through the filtering device.

There has long been a need for a continuous melt filter capable of: operating on a truly continuous basis, and thus capable of maintaining fixed conditions in the melt being filtered; filtering melts which are not self-lubricating; filtering melts without excessive leakage of melt material to the outside; and filtering less viscous melts such as epoxy resins.

SUMMARY OF THE INVENTION

Accordingly, an object of the present invention is to provide an improved method and apparatus for the filtration of fluid materials, and especially heat-softened plastics materials, which allows for the consistent and continuous production of a purified material.

It is a further object of the present invention to provide an improved continuous filter wherein an increase in pressure caused by the clogging of the filter with impurities is detected so that the rate of advancement of the filter may be adjusted to maintain a relatively constant pressure drop across the filter medium over a long period of filtration time.

It is also an object of the present invention to provide a filtration device capable of filtering melts having a wide range of viscosities.

It is yet another object of the invention to provide filters with seals that are wear and leak resistant when filtering high viscosity melts.

Another object of the present invention is to provide an improved filter capable of handling a wide range of filter media.

Other objects and advantages of the present invention will become apparent from the following detailed description taken in connection with the accompanying drawings.

The above and other objects of the present invention are achieved, according to a preferred embodiment thereof, by providing a continuous filter employing roller seals to seal the filter medium and prevent leakage of the melt to the outside.

The invention is of a filter in which a strip of filter medium is continuously fed through the filter body. More particularly, in one embodiment, the present invention provides an improved filter assembly comprising a supply storage section adapted to receive and store a web of filter medium in roll form, a melt treating section through which the filter medium is advanced, and a rewind section including a takeup spool to rewind the filter medium in roll form. The rate of movement of the filter medium through the filter body is controlled to keep the pressure drop across the filter relatively constant. The filter body is equipped with roller seals to prevent leakage of melt from the filter. The filter medium is moved through the filter body either by driven rollers or through the action of a drive takeup roll or both. The filter is supported by a backup or support plate on the downstream side of the filter.

One advantage of the present invention is that, unlike previously known continuous filters which only approximate continuous filter medium movement through a series of discrete displacements of the medium, movement of the filter medium through the filter body can be truly continuous to more easily and effectively maintain a desired pressure drop across the filter.

Another advantage of the present invention is that the roller sealed device of this invention allows less melt to leak to the outside than previously known devices.

The reduced leakage of resin raises the process yield, reduces labor requirements, and enhances process safety.

Yet another advantage of the present invention is that the roller sealed device of this invention is capable of filtering materials, such as epoxy resins, which, because of their lower viscosities and relatively sharp melting point, could not be efficiently handled by previously known devices due to excessive leakage of melt to the outside.

Another potential advantage of the roller sealed filter of the present invention is that it makes possible the removal of high concentrations of impurities without the excessive yield losses which would be encountered in a melt sealed device.

In order to prevent leakage of the high viscosity epoxies from the filters, the present invention also provides elastomeric seals comprising, preferably of silicone rubber, in the form of 0-rings or other shapes, as needed. These seals are installed at potential leakage points, especially where a moving component is required to move against a stationary component. Thus, 0-rings are typically installed in grooves in the housing, where the upper and lower flat ends of cylindrical rollers rotate against the housing. Other types of elastomeric seals may be used at the interface between a curved moving roller surface and a housing surface. Further, the invention also provides a unique dual component seal positioned where a moving surface contacts a stationary surface, such as where seal rollers contact urging rollers, or at other high wear locations. A wear-resistant saddle component of the seal is preferably fabricated from a hard-wearing steel or coated steel, such as steel coated with carbide, or from a wear-resistant composite or ceramic material. The other component is elastomeric and is partially embedded in a groove in the stationary surface against which the other surface moves. Two-component seals of this design minimize wear of the elastomeric component and reduces the need for downtime to replace seals thereby increasing utilization of the filter.

Another potential area for leakage is at the extreme ends of the filter which are in contact with a support device, such as a plate or rotary support. Thus, it is preferred that the ends of support device are supplied with "end plates" that are impermeable to filtrate. The filter band therefore extends across the entire surface of the support and overlaps the plate covered ends of the support. While these end plates cause some sacrifice of area available for filtration, leakage around filter edges is effectively eliminated. The width of the end plates should be just sufficient to eliminate leakage and will depend upon the size or width of the filter band. Thus, when the filter band is about 24 inches wide, then the end plate is about 0.5 inches at each end.

The present invention recognizes and addresses the previously mentioned, long-felt needs. To one of skill in this art who has the benefit of this invention's teachings and disclosures, other and further objects and advantages will become clear, from the following description of the preferred embodiments.

BRIEF DESCRIPTION OF THE DRAWINGS

The above and other embodiments of the present invention may be more fully understood from the following detailed description when taken together with the accompanying drawings.

DESCRIPTION OF THE PREFERRED EMBODIMENTS 1, z, 3, 4, and

Referring now to the drawing, FIGS. 1, 2, 3, 4, and 5 illustrate preferred embodiments of the present invention of the continuous filter. The continuous filter comprises an apparatus for filtering contaminants from a heat-softened material which comprises a filter body or housing 10. The housing 10 would typically be located just downstream of or as part of the barrel of an extruder, but could also be used in a process which does not include an extruder. Material to be filtered enters the filter from one end through an inlet port 12, and is made to flow under pressure. The filter housing 10 is provided with opposed inlet port 12 and outlet port 14 flanking the melt flow passage 16.

A filter band 18 of substantial length made of an appropriate filtering medium is provided on a filter medium feed roll 20. Various filtering media may be employed. The appropriate material is selected in view of the type of melt being filtered, the nature and concentration of the expected impurities to be filtered out, the desired filtration efficiency, the temperature of the melt, and other factors normally used in selecting a filtering medium.

The filter band 18 enters and leaves the filter housing 10 approximately perpendicular to the direction of flow of the melt. The filter band has two sides or faces-one facing the inlet 12 to the passage 16, which will contact unfiltered material. This is referred to as the "upstream side" of the filter. The second side of the filter, facing the outlet 14 of the passage 15 which will contact filtered material, is in contact with filtered material and is termed the "downstream side" of the filter. The filter band 18 is supported inside the melt flow passage 16 by a filter support shown as plate 22. The filter band 18 is passed across the melt flow passage 16 so that the melt is forced to flow through the filter thereby becoming cleansed of any contaminants contained therein.

Located inside the filter housing 10 are a set of at least two roller means (FIGS. 1-5) each comprising at least two seal rollers 24, 26. These rotatable seal rollers 24, 26 are mounted on movable carriages 36, 38 and are urged by positioning or urging means (e.g., springs 110 in FIG. 1; positioner 56 in FIG. 2, positioners 70 and 72 in FIGS. 3 and 4) against the side of the filter band 18 that faces the inlet 12 of passage 16. The urging of the seal rollers 24, 26 against the filter band 18 and an opposing surface in housing 10 (flat surface 34 or the surfaces of rollers 50, 52) serves to seal the housing from the outside environment and preclude leakage of the material being filtered from the apparatus.

The direction of movement of the filter band 18 is, for convenience, described throughout as being from top to bottom where the top seal roller 24 is the seal roller through which the clean filter band enters the device. The device of this invention could also be operated by passing the filter band 18 through the device in an upward direction. Similarly, the device could be disposed horizontally so that the filter band moves horizontally.

Figure 1:
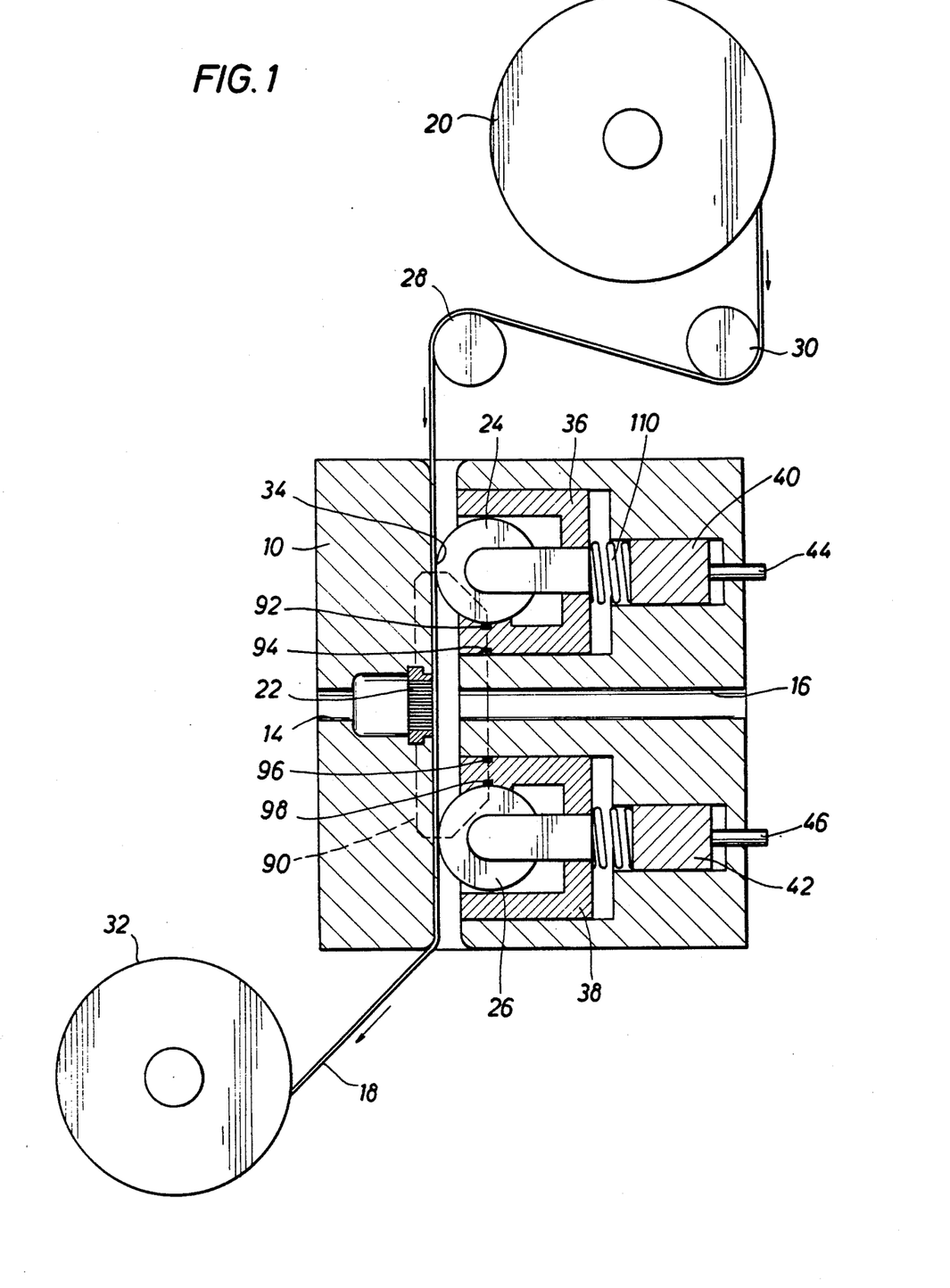
FIG. 1 is a view of the continuous filter showing the seal rollers operating against a flat surface.

In the event that the filter is constructed such that seal roller 24 is vertically above seal roller 26, then seal roller 24 is termed the "top seal roller" and seal roller 26 is the "bottom seal roller". However, the apparatus may be constructed with side-by-side seal rollers, so that seal roller 24 as shown in FIG. 1 may also be termed the "inlet" seal roller since the filter band 18 encounters roller 24 first upon entering the filter apparatus. Likewise, seal roller 26 as shown in FIG. 1 is then the "outlet seal roller." Regardless of nomenclature, a "first set of roller means" defines a set of at least two seal rollers 24, 26. The first set of roller means has at least one seal roller positioned on each of the opposite sides of passage 16 and in direct urging contact with the side of the filter band 18 that faces unfiltered material entering from the inlet 12 of passage 16.

It is preferred that the movement of the filter band 18 be from top to bottom because this will reduce the probability of the melt and filtered materials falling back onto the device from the filter band exiting the device.

Although a single pair of seal rollers is shown, it is within the scope of this invention to have additional seal rollers, or pairs of seal rollers, inside or outside of the filter. For example, guide rollers 28 and 30, or similar means, can be used outside the filter housing 10 to facilitate the feeding of the clean filter medium. Similar rollers (not shown) can be used to assist in the taking up of the used filter band.

The used filter medium is mounted after its exit from the filter housing 10 on a windup roll 32. The windup roll 32 is capable of taking up the filter medium 18 leaving the filter housing 10 and rolling it for subsequent disposal or for subsequent cleaning for reuse.

In another embodiment, not shown in the drawing, the filter medium feed roll 20 and windup roll 32 are eliminated in a process wherein the filter band 18 forms a single endless band which is continuously fed into the filter housing 10 and which, upon exiting the filter housing 10 undergoes a regeneration process which cleans the filter and prepares it for reuse.

The seal rollers 24 and 26 may or may not be independently driven, it is however preferred that they be driven rollers. When they are driven, the seal rollers 24 and 26 serve to conduct the filter band 18 through the device. When the seal rollers 24 and 26 are not driven, the filter band 18 is pulled through the filter housing 10 by the action of the windup roll 32.

The seal rollers 24, 26 may urge the filter band 18 against either curved surfaces, as in other roller surfaces, or against a flat surface 34. Thus, for example, as shown in FIGS. 2, 3, 4 and 5, a second roller means comprising rollers 50, 52 are located opposite to seal rollers 24, 26 respectively, pinching filter band 18 between the surfaces of the seal rollers and the rollers 50, 52 thereby providing a seal to prevent leakage of material from the filter apparatus.

Figures 2, 5:
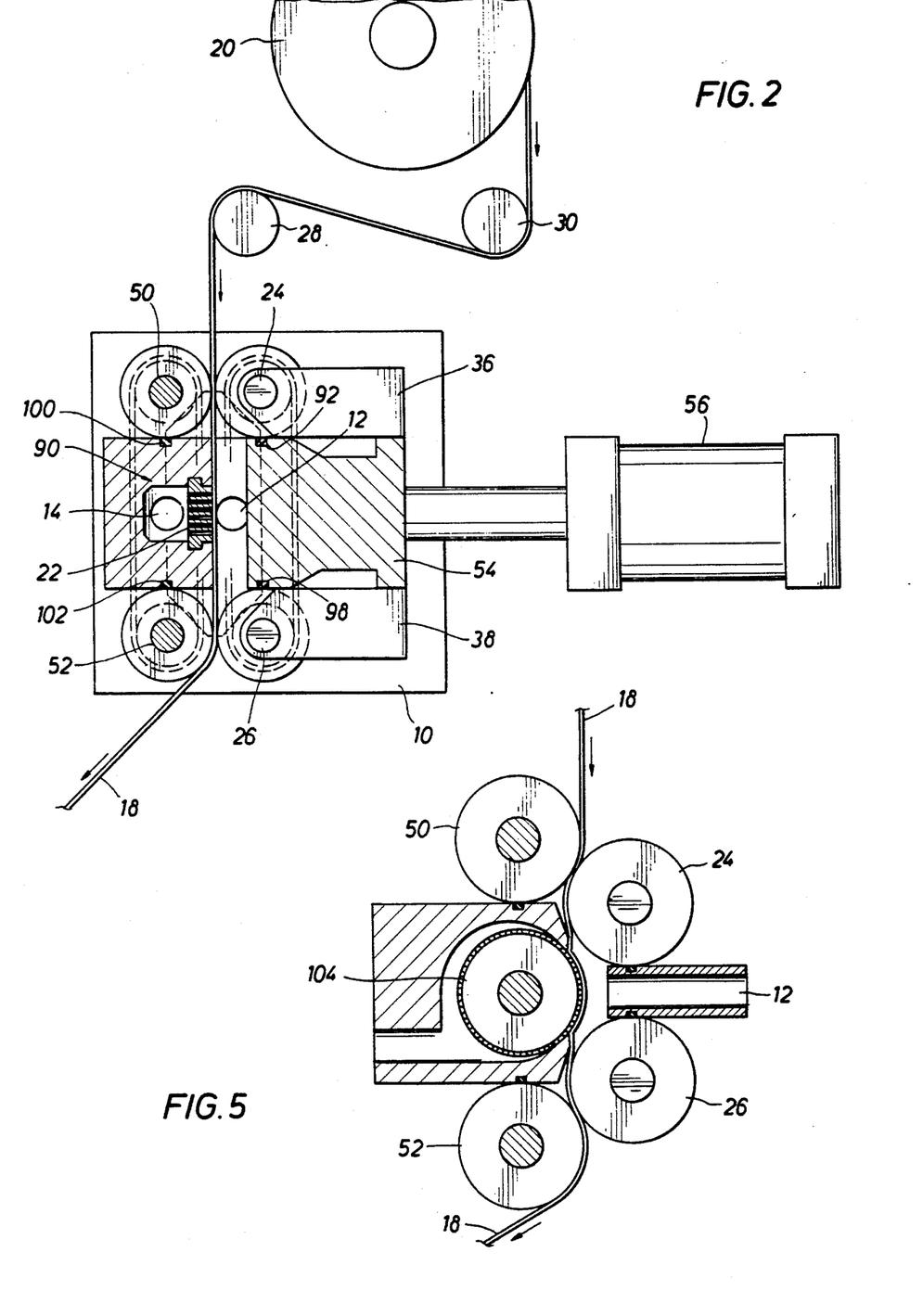
FIG. 2 is a view of the continuous filter showing the seal rollers operating jointly against stationary seal rollers.
FIG. 5 is a blow-up view of the continuous filter with the rotary support.

The seal rollers can work against a flat surface 34, pinching the filter band 18 between the surface of the seal rollers, 24 and 26, and the opposing flat surface 34, as is shown in FIG. 1. The seal rollers 24, 26 are urged against the filter medium 18, which in turn presses against the opposing flat surface 34 of the housing, by means of urging means shown in FIG. 1 as springs 110. Alternatively, and preferably, the seal rollers 24 and 26 can work against a top seal roller 50 and a bottom seal roller 52, pinching the filter band 18 between the surface of the seal rollers 24 and 26 and the seal rollers 50 and 52, respectively, as is shown in FIG. 2. Seal rollers 50 and 52 are preferably mounted so that they rotate to reduce drag and allow smooth passage of the filter band 18 across their surfaces.

The pinching action caused by urging the seal rollers 24, 26 against the filter band 18 and opposing surfaces (whether flat or curved) results in a tight seal preventing the loss of material from the housing via gaps between seal roller 24 or 26, filter band 18 or opposing surface. Further, seals 100, 92, 102, and 98, as exemplified in FIG. 2, also act to prevent leakage. These seals are preferably elastomeric.

Figure 7:
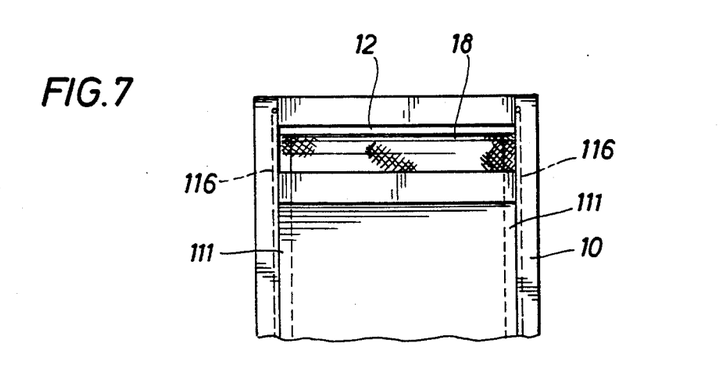
FIG. 7 is a schematic partial end view of FIG. 6A viewed from the inlet to the filter housing showing filter-covered rotary filter support, end plates (in broken lines), and seals.

In another feature of the invention that prevents leakage of contaminated material from the upstream to the downstream side of the filter, the filter band 18 extends beyond the full length of the area of the support device available for filtration, whether a rotary support 104 or flat plate 22. Thus, the filter supports have "end plates" 111, as shown in broken lines in FIG. 7 (which is a view as seen from the inlet 12 to housing 10), through which material cannot pass and that prevent leakage.

The seal rollers may be as shown in the figures, or their surfaces may have smooth-surfaced grooves running parallel to the axis of the rollers. In some instances, it may be beneficial for the rollers to be grooved, especially the rollers at the filter band outlet. This would tend to facilitate the removal of the contaminants from the system. The contaminants may be accommodated in the interstices between the grooves whereas a solid seal roller would tend to compress the contaminants, and may cause the contaminants to stay in the device, thus clogging the device and preventing the proper removal of the contaminants.

It is preferred that the seal rollers 24 and 26 be driven, while the windup roll 32 serve merely to take up the slack filter band 18 exiting the filter housing 10. In the preferred embodiment, the seal rollers 24 and 26 work against fixed seal rollers 50 and 52, respectively, pinching the filter band 18 between the surface of the seal rollers 24 and 26 and the fixed rollers 50 and 52. The two seal rollers 24 and 26 are driven at approximately the same speed. Preferably, the bottom seal roller 26 is driven at a slightly higher speed than the top seal roller 24 so as to keep the filter band 18 in tension.

The rate at which the filter band 18 is driven, either by the windup roll 32, or, preferably, by the seal rollers 24 and 26, is automatically controlled as a function of the differential pressure in the melt flow passage 16 across the filter. A pair of pressure sensors, not shown in the drawing, one located upstream of the filter and the other located downstream of the filter, are provided to measure the melt pressures upstream and downstream of the filter. Calculations are made of the differential pressure, an appropriate rate of movement of the filter medium is determined, and the driving of the filter medium is controlled to operate in such a way as to ensure the appropriate rate of filter medium movement.

In an alternative and preferred control scheme, the rate at which the filter band 18 is driven is set at some convenient value and the differential pressure across the filter band 18 is maintained at a desired value not through varying the speed of the filter band 18 but rather by varying the size of the gap through which the filter band 18 leaves the filter housing 10.

The seal rollers 24, 26, 50, and 52 can be constructed of any suitable material, preferably metal, and are mounted in carriages. FIG. 1 shows an embodiment wherein the top seal roller 24 is mounted in a top roller carriage 36 while the bottom seal roller 26 is mounted in a bottom roller carriage 38. The top carriage 36 is driven by a top carriage loading bar 40 and a top guide rod 44. The bottom carriage 38 is driven by a bottom carriage loading bar 42 and a bottom guide rods 46. The side view of FIG. 1 only shows a single guide rod 46. In practice, a plurality, typically four, horizontally oriented guide rods 46 would be used.

FIG. 2 shows an embodiment wherein both seal rollers 24 and 26 are mounted in an inlet body having roller carriages 54 with both seal rollers being jointly actuated through a single positioner 56.

Figure 3:
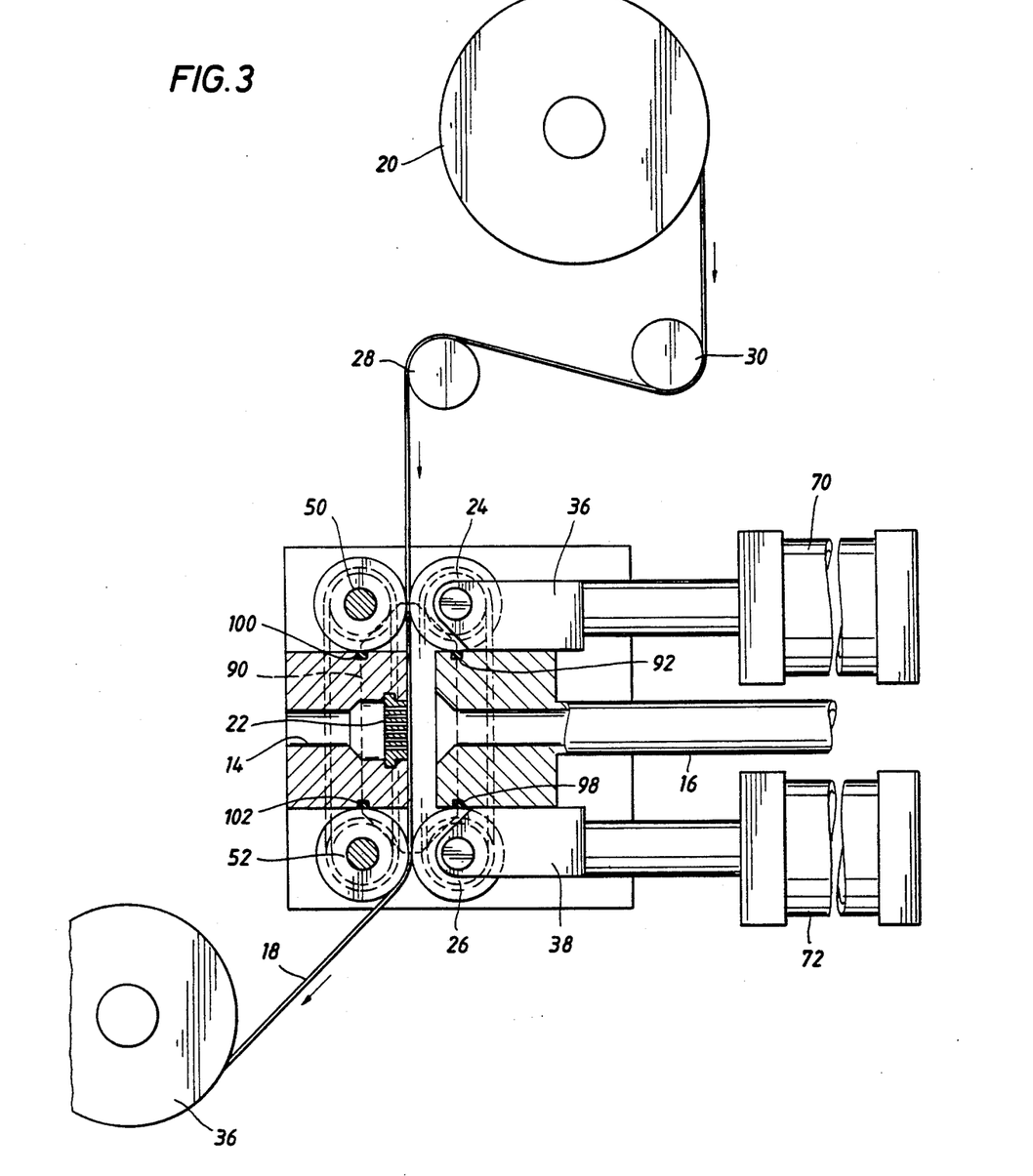
FIG. 3 is a view of the continuous filter showing the roller seals operating independently against stationary seal rollers.

FIG. 3 shows yet another embodiment wherein the top seal roller 24 is mounted in a top roller carriage 36 while the bottom seal roller 26 is mounted in a bottom roller carriage 38 as in FIG. 1, but where the top roller carriage 36 is actuated by a top seal positioner 70 while the bottom roller carriage 38 is actuated by a bottom seal positioner 72.

Figure 4:
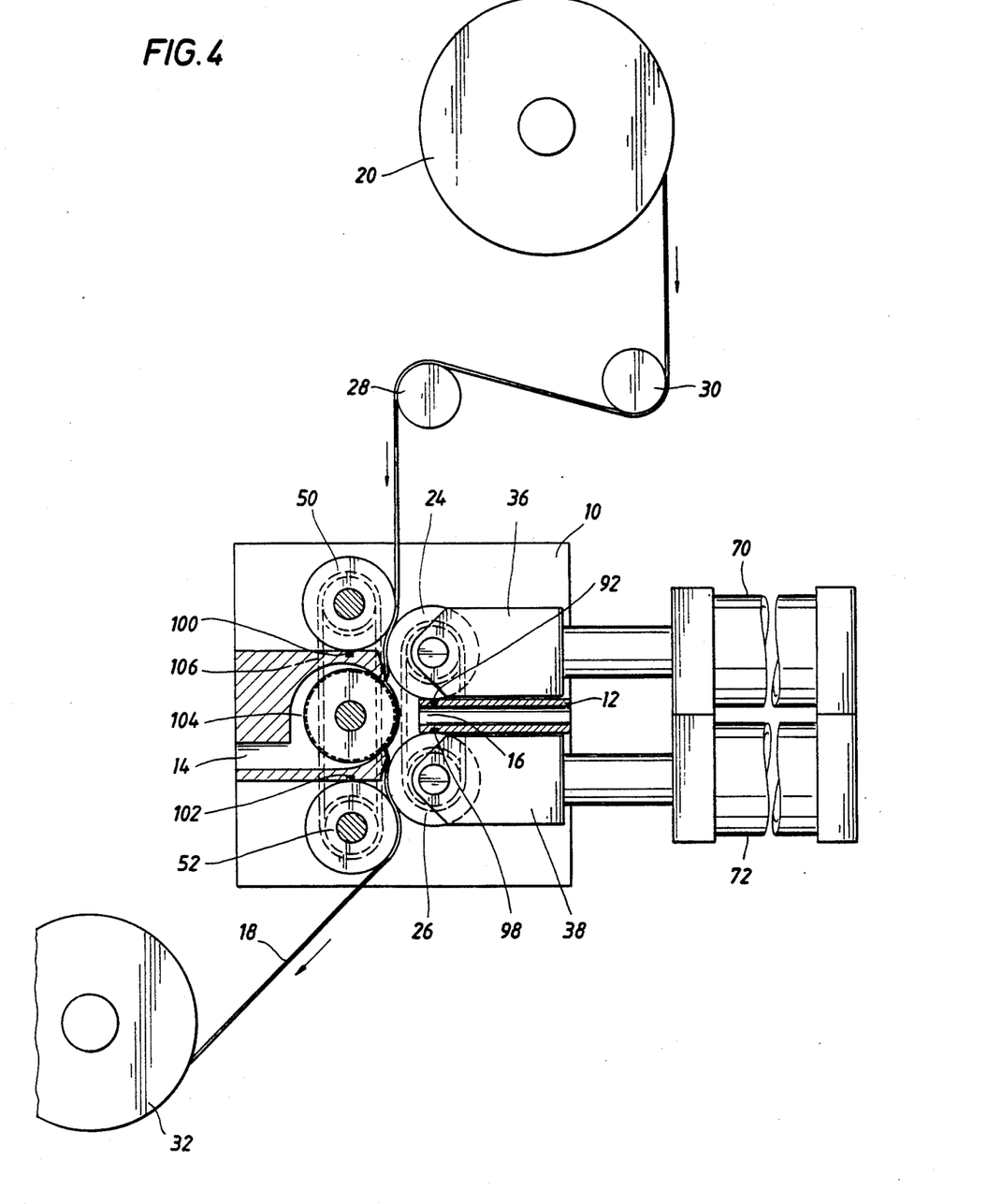
FIG. 4 is a view of the continuous filter showing the device of FIG. 3 with the addition of a rotary filter support.

In another embodiment of the present invention, shown in FIGS. 4 and 5, a rotary filter support 104 is interposed between the two fixed rollers 50 and 52. The resin to be filtered passes through the filter medium 18 and through the rotary filter support 104. The rotary filter support 104 may or may not be driven. The driving, if any, of the rotary filter support 104 can be accomplished through use of a drive chain 106. This configuration tends to reduce the drag on the filter cloth. The rotary filter support 104 would typically move at the same speed as the filter medium 18 thereby reducing or eliminating the drag that would otherwise result.

Figure 6A:
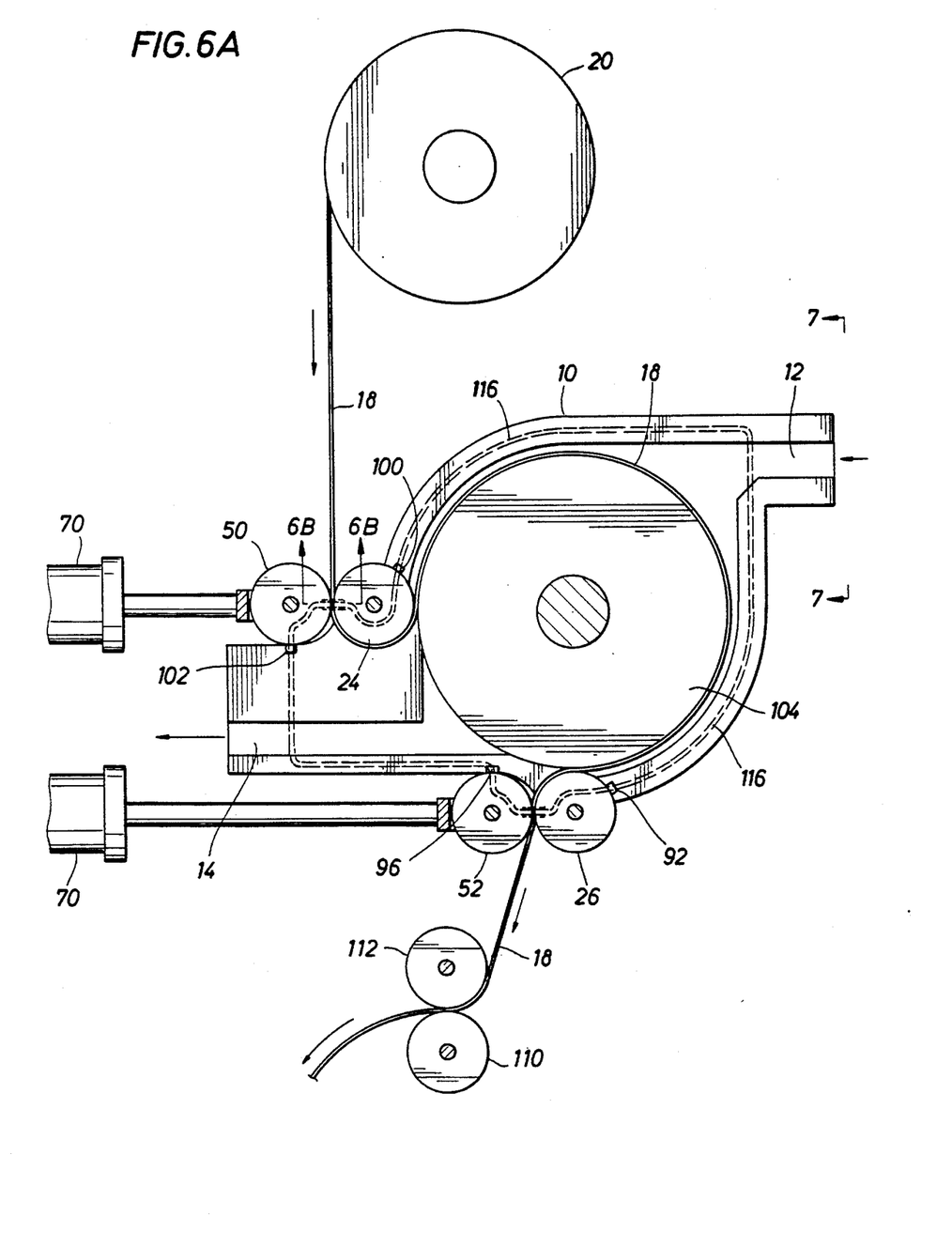
FIG. 6A is a schematic of another embodiment of the invention filters showing greater use of filtration area using a rotary filter support.

With reference to FIG. 6A, in this embodiment maximum use is made of filter band area. Filter band 18 loops around seal roller 24, filter support 104, shown as a rotary support, seal roller 26 and thence through tensioning rollers 110, 112 to disposal. As shown, about 270° of the 360° area of the rotary filter support is covered by the filter band 18 and is therefore available during filtration. The filter can clearly be designed to utilize a greater or lesser proportion of the surface area of filter support 104 during filtration. To prevent leakage of material to be filtered around rollers 24 and 26, they are sealed against the housing with seals 100 and 92, respectively, preferably elastomeric seals. Further, rollers 50 and 52 urge against the downstream side of filter band 18 so that band 18 is urged against seal rollers 24 and 26, thereby providing a pinch point seal to prevent leakage of material from the housing. Roller 50 is sealed against the housing by seal 102 and roller 52 is likewise sealed by seal 96. Also, at least one O-ring elastomeric seal 116 is positioned in a groove in the internal surface of housing 10 and in contact with filter components, as exemplified in FIG. 6A, to prevent leakage. Preferably, two such seals 116 are utilized, one on each of two opposing housing internal surfaces (i.e., top and bottom, or left and right side depending upon orientation of the filter's rollers).

In the embodiment of FIG. 6A, the positioners 70 urge the rotatable rollers 50 and 52 against the "downstream side" of the filter band 18 to urge the filter band against surfaces in the housing to prevent leakage of material from the housing 10.

In the other illustrated embodiments, the various carriages are also sealed with elastomeric seals using customary and generally known sealing techniques. For example, the carriages 36 and 38 are sealed with elastomeric material to the filter housing 10 with a side seal 90. Shown in FIGS. 1 are the top and bottom roller seals 92 and 98, respectively. Also shown are the top and bottom carriage seals 94 and 96, respectively. In FIG. 4 the top and bottom fixed roller seals 100 and 102, respectively, can also be observed.

Figure 6B:
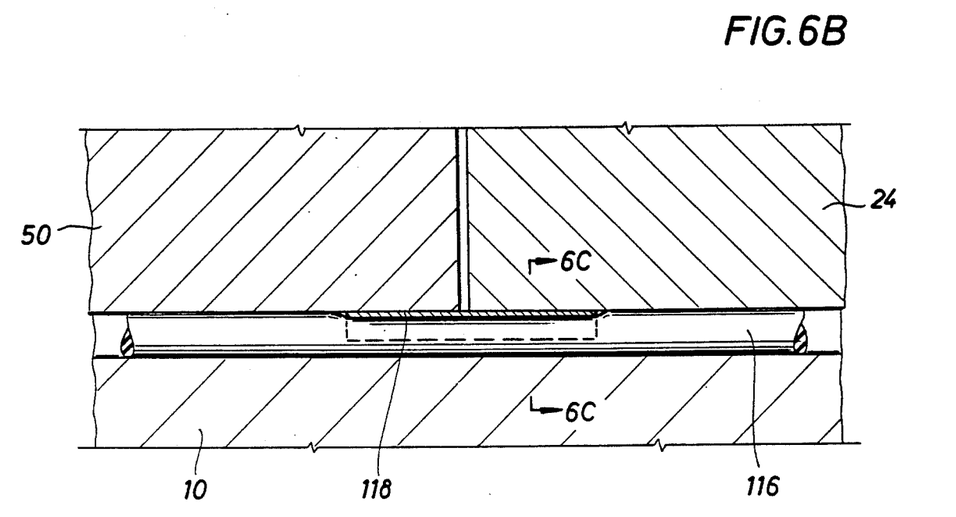
FIG. 6B shows a two component seal interposed between two seal rollers.
Figure 6C:
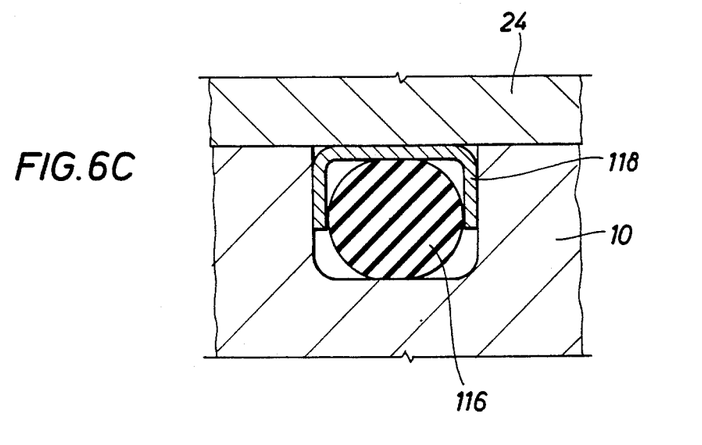
FIG. 6C is a cross-section taken at C—C of FIG. 6B.

The invention also provides a two-component seal that includes an elastomeric component at least partially covered by a wear-resistant harder surfaced saddle. Thus, FIG. 6B shows an enlarged detail rotated at 90° from 6B—6B of FIG. 6A of seal 116 between housing 10 and the rotating surfaces of seal rollers 24 and 50. At the wear-prone seal area contacting the ends of seal rollers 24 and 50, the wear surface of elastomeric seal 116 is covered with a wear-resistant saddle component 118. Thus, as shown in FIG. 6C, a cross-section at C—C of FIG. 6B, the elastomeric seal 116 is engaged in a groove in the housing 10 surface and the wear-resistant saddle 118 covers the exposed area of seal 116 so that the saddle's surface interfaces with seal roller 24. This type of dual-component seal can also be used at other high wear locations in the filter to reduce wear.

Upon reviewing this specification, a person of skill in the art may appreciate certain changes that can be made in the method and apparatus taught without departing from the spirit and the scope of this invention. These changes are within the scope of the invention as described above and claimed below.

What is claimed is:

1. An apparatus for continuously filtering contaminants from a heat-softened plastic material containing contaminants, said apparatus comprising:
   (i) a housing with a passage for the flow of material therethrough, the passage having an inlet for receiving material containing contaminants and an outlet for discharging filtered material from which contaminants have been removed;
   (ii) a filter band having a portion capable of continuously moving across the passage, said filter band portion positioned between the inlet and outlet of the passage so that material passing from inlet to outlet passes through the filter band portion, the filter band having an upstream side adjacent the inlet and a downstream side adjacent the outlet;
   (iii) a first pair of roller means for sealing the portion of the filter band through which material passes, the roller means comprising seal rollers, means for rotatably mounting said seal rollers within said housing, said seal rollers positioned on opposite sides of the passage and in direct contact with the upstream side of the filter band;
   (iv) elastomeric seals located at contact points between the seal rollers and the housing to provide a seal therebetween;

(v) a filter support located in the passage, between the first pair of roller means and against the downstream side of the filter portion that faces the outlet of the passage, to support the portion of the filter band capable of moving across the passage when material flows through the filter band; and (vi) positioning means for urging the first pair of roller means for sealing against the upstream side of the filter band and urging the downstream side of the filter band against a surface in the housing thereby providing a seal sufficiently tight to prevent leakage of material from the housing; and wherein the surface in the housing against which the roller means urges the downstream side of the filter band comprises the surfaces of seal rollers of a second pair of roller means for sealing located opposite to the first set of roller means and on the downstream side of the filter band, and means for rotatably mounting said second pair of roller means within said housing.

2. The apparatus of claim 1, wherein axes of the second set of roller means are held fixedly relative to the housing and the surfaces of the seal rollers of the second set of roller means rotate when the filter band moves across the passage.

3. The apparatus of claim 1, wherein the filter support is a flat plate with holes therethrough for flow of material that has passed through the filter band.

4. The apparatus of claim 1, wherein the filter support comprises a rotary drum filter support, and means for rotatably mounting said rotary drum filter support within said housing, whereby said rotary drum filter support rotates to reduce drag on the filter band portion when the portion moves across the passage.

5. The apparatus of claim 4, further comprising end plates at each end of the rotary filter support to prevent leakage of contaminated material around edges of the filter portion in contact with the support to the downstream side of the filter portion.

6. The apparatus of claim 1 wherein said elastomeric seals comprise:
(i) an elastomeric component with a first portion engaged in a groove in a surface of the housing adjacent said seal rollers; and
(ii) a wear-resistant saddle component mounted on a second portion of the elastomeric component, said saddle component interfacing with rotating seal roller surfaces.

7. An apparatus for continuously filtering contaminants from a heat-softened plastic material containing contaminants, said apparatus comprising:
(i) a housing with a passage for flow of materials therethrough, the passage having an inlet for receiving material containing contaminants and an outlet for discharging filtered material from which contaminants have been removed;
(ii) a filter band having a portion capable of continuously moving across the passage, said filter band portion positioned between the inlet and outlet of the passage so that material passing from inlet to outlet passes through the filter band portion, the filter band having an upstream side adjacent the inlet and a downstream side adjacent the outlet;
(iii) a first pair of roller means for sealing the portion of the filter band through which material passes, the roller means comprising seal rollers, means for rotatably mounting said seal rollers in the housing, said seal rollers positioned on opposite sides of the passage and in direct contact with the upstream side of the filter band;
(iv) a flat plate filter support with holes therethrough for flow of material that has passed through the filter band, said filter support located in the passage, between the pair of roller means and against the downstream side of the filter portion capable of moving across the passage to support said portion of the filter band; and
(v) positioning means for urging the first pair of roller means for sealing against the upstream side of the filter band and urging the filter band against a surface in the housing thereby providing a seal sufficiently tight to prevent leakage of material from the housing.

8. The apparatus of claim 7, further comprising a seal for preventing leakage between seal rollers and the housing, the seal comprising:
(i) an elastomeric component with a first portion engaged in a groove in a surface of the housing adjacent said seal rollers; and
(ii) a wear-resistant saddle component mounted on a second portion of the elastomeric component, said saddle component interfacing with rotating seal roller surfaces.

9. An apparatus for continuously filtering contaminants from a heat-softened plastic material containing contaminants, said apparatus comprising:
(i) a housing with a passage for the flow of material therethrough, the passage having an inlet for receiving material containing contaminants and an outlet for discharging filtered material from which contaminants have been removed;
(ii) a filter band having a portion capable of continuously moving across the passage, said filter band portion positioned between the inlet and outlet of the passage so that material passing from inlet to outlet passes through the filter band portion, the filter band having an upstream side adjacent the inlet and a downstream side adjacent the outlet;
(iii) a first pair of roller means for sealing the portion of the filter band through which material passes, the roller means comprising seal rollers and means for rotatable mounting said first pair of seal rollers within said housing said seal rollers positioned on opposite sides of the passage and in direct contact with the upstream side of the filter band; and
(iv) a filter support, located in the passage between the first pair of rollers and against the downstream side of the filter portion that face the outlet of the passage, to support the portion of the filter band capable of moving across the passage;
(v) positioning means for urging the first pair of roller means for sealing against the upstream side of the filter band and urging the filter band against surfaces of second seal rollers of a second pair of roller means for sealing against the downstream side of said filter band, means for fixedly holding axes of the second pair of roller means relative to the housing, the second seal rollers being located opposite the first pair of roller means and on the downstream side of the filter band, means for rotatably mounting said second pair of roller means such that the surfaces of the second seal rollers rotate when the filter band moves across the passage.

10. The apparatus of claim 9, wherein the first pair of roller means are mounted on a single movable roller carriage so that the seal rollers are capable of being urged by one positioning means.

11. The apparatus of claim 10, wherein the filter support is a flat plate with holes therethrough for flow of material that has passed through the filter band.

12. The apparatus of claim 9, wherein the seal rollers of the first pair of roller means are each mounted on separate movable roller carriages and wherein each seal roller is urged by separate positioning means against the filter band.

13. The apparatus of claim 12, wherein the filter support is a flat plate with holes therethrough for flow of material that has passed through the filter band.

14. The apparatus of claim 12, wherein the filter support comprises a rotary drum filter capable of rotation to reduce drag on the filter band portion when the portion moves across the passage.

15. The apparatus of claim 14, further comprising end plates at each end of the rotary filter support to prevent leakage of contaminated material around edges of the filter portion in contact with the support to the downstream side of the filter portion.

16. The apparatus of claim 9, further comprising a seal for preventing leakage between seal rollers and the housing, the seal comprising:
  (i) an elastomeric component with a first portion engaged in a groove in a surface of the housing adjacent said seal rollers; and
  (ii) a wear-resistant saddle component mounted on a second portion of the elastomeric component, said saddle component interfacing with rotating seal roller surfaces.

17. An apparatus for continuously filtering contaminants from a heat-softened plastic material containing contaminants, said apparatus comprising:
  (i) a housing with a passage for the flow of material therethrough, the passage having an inlet for receiving material containing contaminants and an outlet for discharging filtered material from which contaminants have been removed;
  (ii) a filter band having a portion capable of continuously moving across the passage, said filter band portion positioned between the inlet and outlet of the passage so that material passing from inlet to outlet passes through the filter band portion, the filter band having an upstream side in contact with unfiltered material and a downstream side in contact with filtered material;
  (iii) a first pair of roller means for sealing the portion of the filter band through which material passes, the roller means comprising seal rollers and means for rotatably mounting said seal rollers within said housing, said seal rollers positioned on opposite sides of the passage and in direct contact with the upstream side of the filter band;
  (iv) elastomeric seals located at contact points between each of the seal rollers and the housing to provide a seal therebetween;
  (v) a filter support located in the passage against the downstream side of the filter band, between the first pair of roller means, to support the filter band portion capable of continuously moving across the passage when material flows through the filter band; and
  (vi) positioning means comprising, a second pair of roller means, the positioning means including means for urging said second pair of roller means against the downstream side of the filter band and urging the upstream side of the filter band against a surface in the housing thereby providing a seal sufficiently tight to prevent leakage of material from the housing.

18. The apparatus of claim 17, wherein the surface in the housing of (vi) comprises the surfaces of the first pair of roller means.

19. The apparatus of claim 18, wherein the filter support comprises a rotary drum filter capable of rotation to reduce drag on the filter band portion when the portion moves across the passage.

20. The apparatus of claim 19, wherein the seal rollers of the first pair of roller means are each independently rotatable.

21. The apparatus of claim 19, further comprising end plates at each end of the rotary filter support to prevent leakage of contaminated material around edges of the filter portion in contact with the support to the downstream side of the filter portion.

22. The apparatus of claim 18, wherein said elastomeric seal comprise:
  (i) an elastomeric component with a first portion engaged in a groove in a surface of the housing adjacent said seal rollers; and
  (ii) a wear-resistant saddle component mounted on a second portion of the elastomeric component, said saddle component interfacing with rotating seal roller surfaces.

* * * * *

UNITED STATES PATENT AND TRADEMARK OFFICE
CERTIFICATE OF CORRECTION

PATENT NO. : 5,320,753

DATED : June 14, 1994

INVENTOR(S) : Peter T. Keillor, III et al.

It is certified that error appears in the above-identified patent and that said Letters Patent is hereby corrected as shown below:

In claim 9, column 12, line 45, "rotatable" should read --rotatably--.

In claim 9, column 12, line 47, "housing" should read --housing,--.

In claim 17, column 14, line 17, "comprising," should read --comprising--.

Signed and Sealed this

Seventeenth Day of January, 1995

Attest:

BRUCE LEHMAN

Attesting Officer       Commissioner of Patents and Trademarks